United States Patent [19]

Darnall

[11] 4,315,886

[45] * Feb. 16, 1982

[54] FLEXIBLE PRINTING PLATE AND ATTACHMENTS THEREFOR

[75] Inventor: John C. Darnall, Thousand Oaks, Calif.

[73] Assignee: The Times Mirror Company, Los Angeles, Calif.

[*] Notice: The portion of the term of this patent subsequent to Jan. 23, 1996, has been disclaimed.

[21] Appl. No.: 804,930

[22] Filed: Jun. 9, 1977

Related U.S. Application Data

[60] Continuation-in-part of Ser. No. 478,826, Jun. 12, 1974, abandoned, and Ser. No. 652,836, Jan. 27, 1976, Pat. No. 4,136,150, which is a division of Ser. No. 449,662, Aug. 22, 1974, Pat. No. 3,986,698.

[51] Int. Cl.³ .................................................. B29F 1/00
[52] U.S. Cl. ....................................... 264/318; 264/334
[58] Field of Search ............... 264/318, 334, 335, 336; 425/DIG. 5, 438, 441; 101/395

[56] References Cited

U.S. PATENT DOCUMENTS

| | | | |
|---|---|---|---|
| 3,220,348 | 11/1965 | Royer | 101/395 |
| 3,408,437 | 10/1968 | Wheeler | 264/226 |
| 3,533,355 | 10/1970 | Wall | 101/415.1 |
| 3,696,744 | 10/1972 | Etchell | 101/415.1 |
| 3,771,449 | 11/1973 | Hill | 101/415.1 |
| 3,782,281 | 1/1974 | Darnall | 101/415.1 |
| 3,791,295 | 2/1974 | Albright | 101/415.1 |
| 3,986,698 | 10/1976 | Darnall | 425/438 |

Primary Examiner—Thomas P. Pavelko
Attorney, Agent, or Firm—Christie, Parker & Hale

[57] ABSTRACT

A flexible thermoplastic printing plate is mounted on a plate cylinder having a given curvature. In its unstressed condition, the printing plate has substantially the same curvature between its ends as the cylinder. The printing plate has laterally extending hooks at its ends. A stationary laterally extending projection on the cylinder engages the hook at one end of the plate. A movable laterally extending projection on the cylinder engages the hook at the other end of the plate; the movable projection is spring-loaded so as to tension the plate longitudinally on the cylinder. A plurality of gussets are formed in each hook and a plurality of recesses for receiving the respective gussets are formed in each projection. Opposite sides of two recesses in each projection are precisely located relative to the cylinder. The opposite sides of the two recesses receive the respective gussets with a close fit to index the plate laterally on the cylinder, while the sides of the remaining recesses receive their respective gussets with a sufficiently loose fit so as not to interfere with such indexing.

4 Claims, 15 Drawing Figures

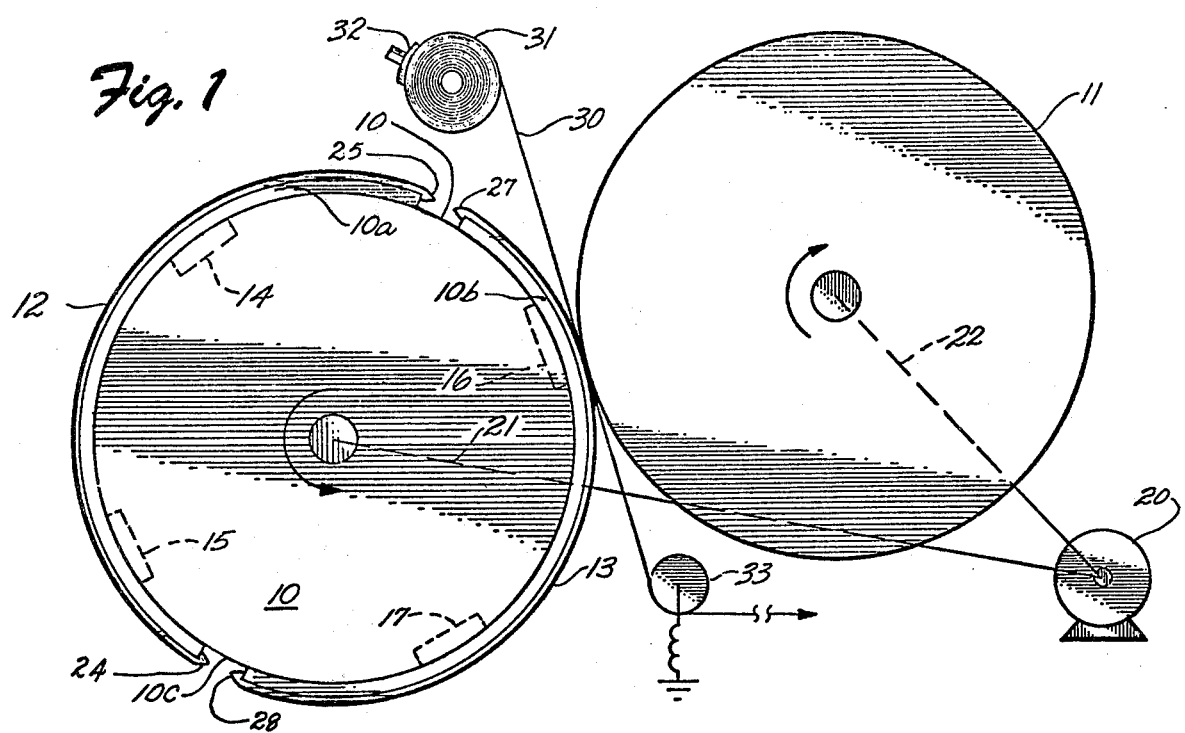
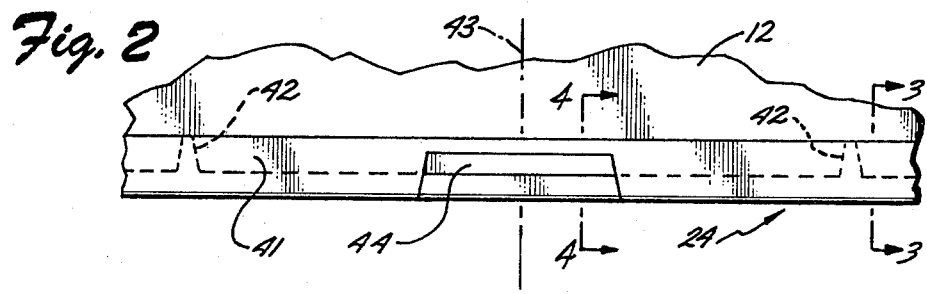
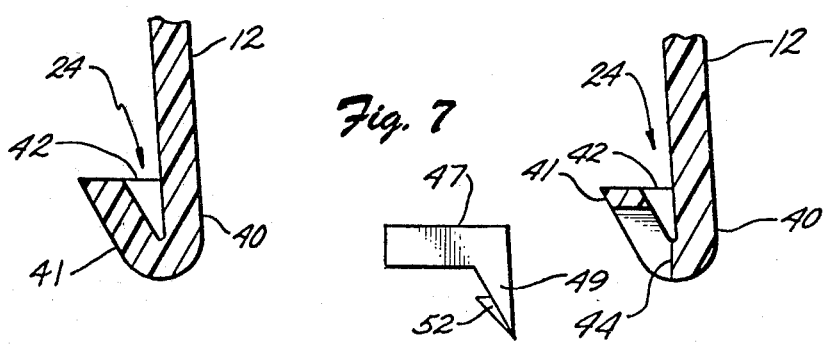

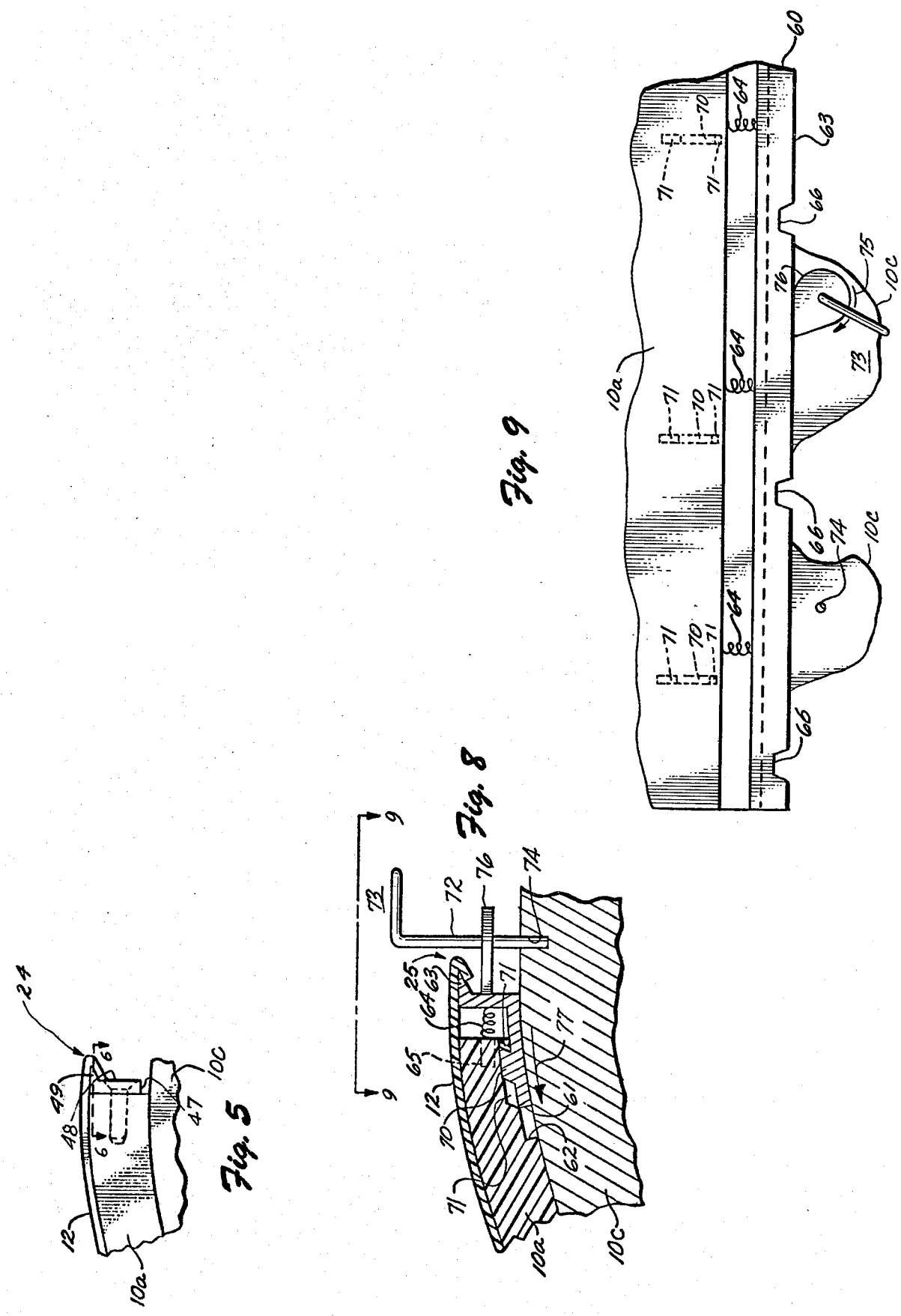

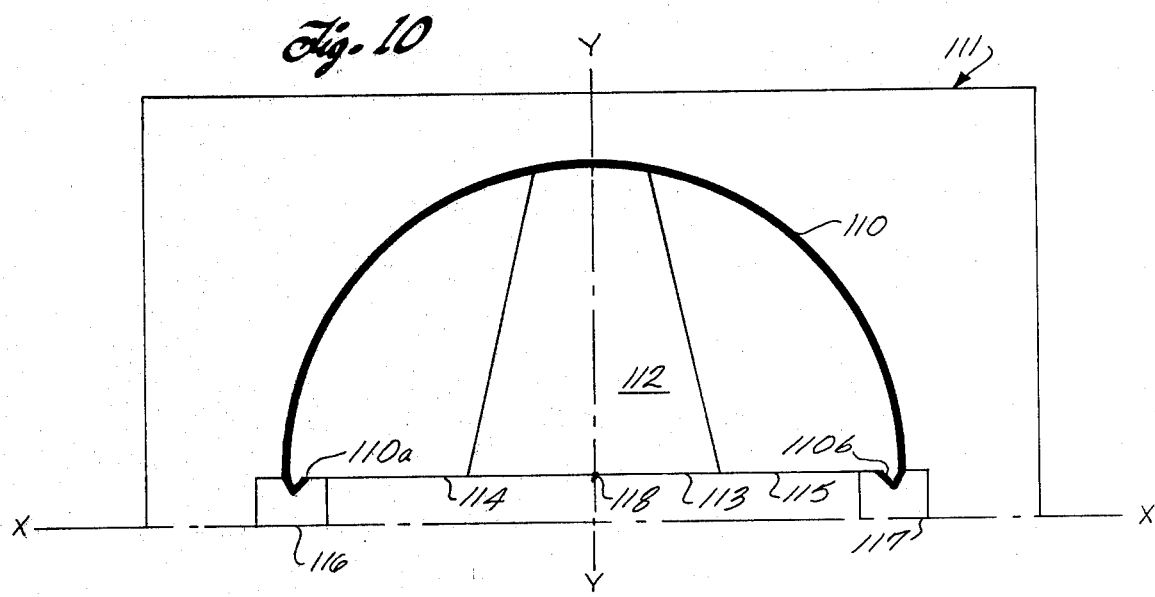

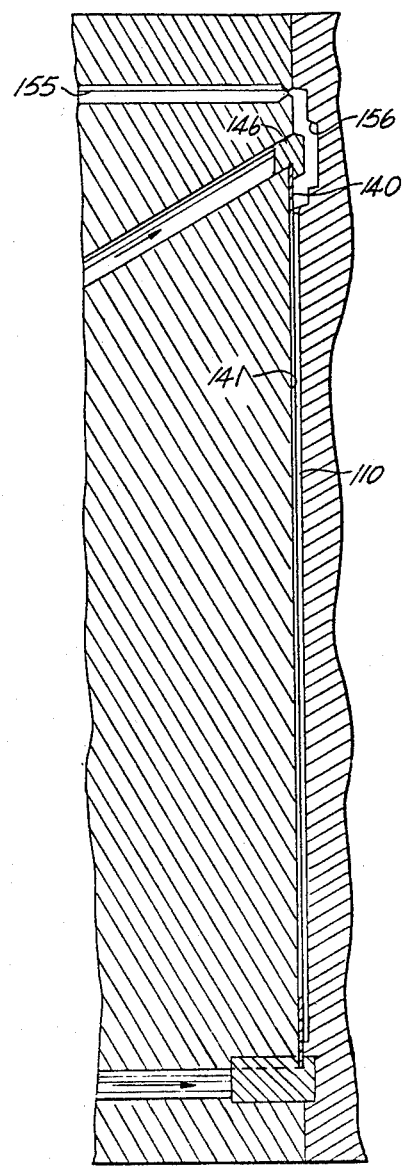

FLEXIBLE PRINTING PLATE AND ATTACHMENTS THEREFOR

CROSS REFERENCE TO RELATED APPLICATIONS

This is a continuation-in-part of application Ser. No. 478,826, filed June 12, 1974, now abandoned, and application Ser. No. 652,836, filed Jan. 27, 1976, now U.S. Pat. No. 4,156,150 which is a division of application Ser. No. 449,662, filed Aug. 22, 1974, now U.S. Pat. No. 3,986,698.

BACKGROUND OF THE INVENTION

This invention relates to the printing art and, more particularly, to a flexible printing plate and a cylinder attaching arrangement therefor.

Recently, there have been developed flexible materials that offer great promise as a replacement for rigid metal printing plates. These flexible materials are plastic. Flexible plastic printing plates are lighter and cheaper than metal plates, have a longer press life, and provide a more accurate representation of the matter to be printed. Until now, flexible plastic printing plates have been produced in a flat mold, as illustrated in U.S. Pat. No. 3,743,463, which issued July 3, 1973 to Richard B. Patrick and John Sonia. The thought process of those working in the art seems to have been that flexible flat plates can be bent easily enough to conform to the curved surface of the cylinder. The flexible plates in the prior art are, therefore, flat in their unstressed condition and become stressed when bent to conform to the curvature of the plate cylinder on which they are mounted.

Flexible printing plates that are flat in their unstressed condition must be held under great longitudinal tension by the cylinder attaching members in order to make the plate fully conform to the cylinder over its entire surface. If insufficient longitudinal tension is applied to the plate, background areas on the plate are falsely printed. If too much longitudinal tension is applied to the plate, the matter to be printed becomes distorted and the plate may creep, i.e., become permanently deformed, and satisfactory color registration cannot be established.

Newspaper printing presents special problems that must be overcome before the use of flexible printing plates becomes practical. In the course of the daily operation of newspaper presses, many printing plates must be installed on and removed from the plate cylinders to print the pages of the various editions. For example, a major newspaper may require a half million or more printing plates a year. Accordingly, the cylinder attaching arrangement must permit fast, easy installation and removal of the printing plates.

SUMMARY OF THE INVENTION

According to the invention, a flexible printing plate consisting of a thermoplastic material has in a one piece construction first and second laterally extending ends, a printing region between the first and second ends having substantially the same curvature in its unstressed condition as the plate cylinder on which the printing plate is mounted, a pair of laterally extending hooks formed at the ends of the plate, and a plurality of gussets formed in each hook at laterally displaced points across its width. The printing plate is attached to the plate cylinder by a pair of laterally extending projections each having a surface that mates and engages the hook at one end of the plate. A plurality of recesses equal in number to the gussets in each hook are formed in each projection to receive the respective gussets of the hooks. At least one of the projections is moved along the circumference to the cylinder in a direction to tension the plate on the cylinder.

The printing region and the laterally extending hooks formed at the ends of the plate can be readily molded in a one piece construction in a single operation. The curvature of the printing region of the plate permits close conformance thereof to the surface of the cylinder without wrinkling or distortion as the plate is tensioned. The gussets hold the laterally extending hooks at both ends of the plate in close conformance with the laterally extending projections as the plate is tensioned, thereby preventing edge smudging during printing due to wrinkling of the ends of the plate.

A feature of the invention is the use of two of the recesses in each projection and the respective gussets for laterally indexing the printing plate on the cylinder. Opposite sides of two of the recesses of each projection are precisely positioned relative to the cylinder, and spaced apart to receive the respective gussets with a close fit to index both ends of the plate laterally relative to the cylinder. The sides of the remaining recesses are spaced apart to receive the respective gussets with a sufficiently loose fit so as not to interfere with the indexing of the plate.

BRIEF DESCRIPTION OF THE DRAWINGS

The features of a specific embodiment of the best mode contemplated of carrying out the invention are illustrated in the drawings, in which:

FIG. 1 is a schematic diagram of a web fed rotary letter printing press;

FIG. 2 is a bottom elevation view of a portion of the end of the flexible printing plate of the invention illustrating one of the attaching hooks;

FIG. 3 is a sectional view of the end of the printing plate of FIG. 2 showing the profile of the attaching hook;

FIG. 4 is another sectional view of the end of the printing plate of FIG. 2 showing the profile of a barb engaging slot in the attaching hook;

FIG. 5 is a side elevation view of the stationary attaching projection in engagement with the hook on the corresponding end of the printing plate;

FIG. 7 is a side elevation view of the stationary projection showing the profile of the projection and the barb engaged by the slot in FIG. 4;

FIG. 8 is a side sectional view of the movable projection in engagement with the attaching hook on the corresponding end of the printing plate;

FIG. 9 is a top plan view of a portion of the movable projection of FIG. 8 without the printing plate; and FIGS. 10 through 14 are schematic diagrams of an injection mold, in which the printing plate of the invention is formed at different stages of the formation; and FIG. 15 is a side sectional view of a portion of the molding apparatus of FIGS. 10 through 14 illustrating in detail the mold cavity and injection inlet.

DETAILED DESCRIPTION OF THE SPECIFIC EMBODIMENT

Figure 6:
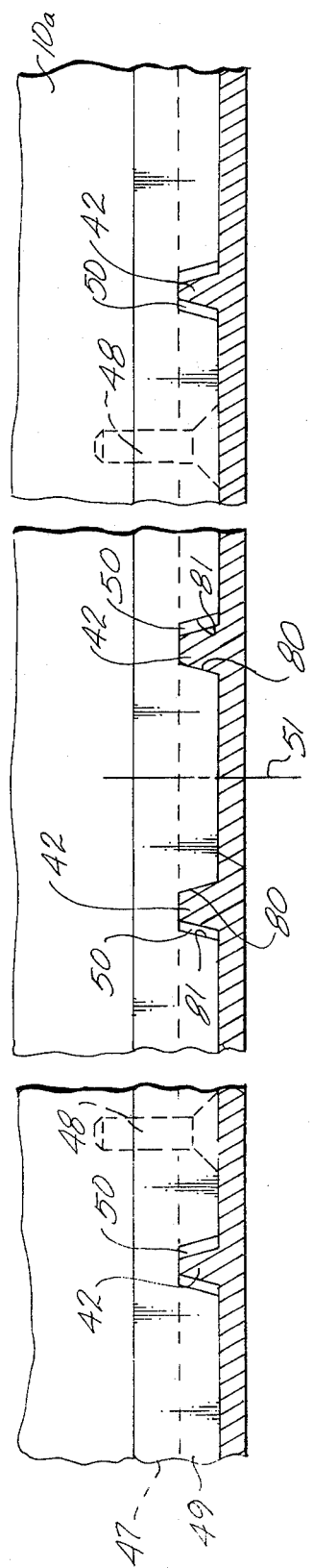
FIG. 6 is a top sectional view of the projection and hook of FIG. 5 taken through plane 6—6.

In FIG. 1, a rotatable plate cylinder 10 and a rotatable blanket cylinder 11 of a web fed rotary letter press are disposed adjacent to each other. Flexible plastic printing plates 12 and 13 are mounted on cylinder 10 by an attaching arrangement described below in detail. Plate cylinder 10 comprises saddles 10a and 10b and a metal plate cylinder 10c. A plate cylinder designed for metal printing plates requires saddles 10a and 10b to adapt the diameter of the plate cylinder for plastic printing plates, which are thinner. Saddles 10a and 10b are designed to engage the plate attaching mechanisms 14, 15, 16, and 17 of metal plate cylinder 10c. Thus, saddles 10a and 10b are secured to cylinder 10c by the same lock-up system that normally secures the metal printing plates to cylinder 10c. If the invention is practiced in a press specifically designed for plastic printing plates, saddles 10a and 10b are eliminated, and the printing plates are mounted directly on the plate cylinder, rather than indirectly thereon through saddles.

A motor 20 is coupled through appropriate gearing represented by a dashed line 21 to plate cylinder 10 to drive it in a counterclockwise direction, as viewed in FIG. 1. Motor 20 is coupled through appropriate gearing represented by a dashed line 22 to blanket cylinder 11 to drive it in a clockwise direction, as viewed in FIG. 1, at the same tangential velocity as plate cylinder 10. Printing plate 12 has a leading end 24 and a trailing end 25, between which a printing region extends. Printing plate 13 has a leading end 27 and a trailing end 28, between which a printing region extends.

A web 30 of paper to be printed is guided between plate cylinder 10 and blanket cylinder 11. Blanket cylinder 11 has a fibrous resilient surface that presses against the printing surface of plates 12 and 13 as plate cylinder 10 rotates. Consequently, the matter to be printed is transferred to web 30, which is pressed between blanket cylinder 11 and printing plates 12 and 13. Web 30 is maintained in tension upstream and downstream of the point where blanket cylinder 11 and plates 12 and 13 press against it. Web 30 is pulled off a rotatably supported paper supply roll 31 by the rotation of cylinders 10 and 11. Upstream tension is maintained on web 30 by a brakeshoe 32 that creates a drag on roll 31. Downstream tension is maintained on web 30 by a system of tension rollers such as that designated 33. The components of the rotatable printing press described to this point are conventional. The invention concerns the construction of flexible plates 12 and 13 and the attaching arrangement between plate ends 24, 25, 27, and 28 and cylinder 10.

Plates 12 and 13 are formed in an injection mold having a curvature that matches the curvature of cylinder 10, preferably in the manner disclosed in my U.S. Pat. No. 3,986,698, which issued Oct. 19, 1976. The disclosure of said patent is incorporated herein by reference. Therefore, in their unstressed condition when removed from the mold, plates 12 and 13 have the same longitudinal curvature between ends 24 and 25 and ends 27 and 28, respectively, as cylinder 10, specifically as the outer surface of saddles 10a and 10b. The printing plates are in their unstressed condition when no external forces are applied to them. When plates 12 and 13 are mounted on cylinder 10, no longitudinal bending strain is set up. Therefore, very little longitudinal tension applied to plates 12 and 13 by the cylinder attaching arrangement maintains the printing regions of plates 12 and 13 in full conformity with cylinder 10 over their entire surface. Typically, plates 12 and 13 would be 0.100 inches thick with depressions that are between 0.030 and 0.040 inches deep, and would be made from a thermoplastic with good flow, i.e., molding characteristics. A suitable plastic for plates 12 and 13 is polypropylene sold by Hercules Chemical Company as Profax PC 973.

FIGS. 2, 3, and 4 depict end 24 of plate 12. Ends 25, 27, and 28 are identical to end 24. End 24 has an arm 40 an an arm 41 that form a laterally extending plate lockup hook made of the same piece of material as plate 12. In other words, plate 12 comprises a printing plate with cylinder lockup means in the form of hooks at the ends of the plate in a one piece plastic construction. Arm 40 is a longitudinal extension of plate 12. Arm 41 is bent back toward plate 12 to form an acute angle, e.g., 30°. Gussets 42, which are formed from the same piece of material as plate 12, extend between arms 40 and 41 at equally spaced intervals along end 24. At the longitudinal center line 43 of plate 12, arm 41 has a slot 44.

Reference is made to FIGS. 5 and 6, which depict a cylinder attaching member 47 for end 24 of plate 12. The cylinder attaching member for end 27 is identical to member 47. Member 47 is secured by fasteners 48 to the end of saddle 10a. Member 47, one-half of the length of which is shown in FIG. 6, is coextensive in length with the width of plate 12. Member 47 has a stationary laterally extending projection 49 that points away from plate 12. Projection 49 has a tapered nose-shaped surface that mates with the hook formed on end 24, e.g., projection 49 tapers at an angle of 30°. Recesses 50 are formed in projection 49 at intervals corresponding to the spacing between gussets 42 at end 24. Recesses 50 receive the respective gussets 42 when projection 49 engages the hook at end 24. At the longitudinal center line 51 of member 47, projection 49 has a barb 52 that tapers at a larger angle than projection 49, e.g., 45°. (See FIG. 7 for a profile of barb 52). Barb 52 engages slot 44 at end 12, which is substantially wider than barb 52.

Reference is made to FIGS. 8 and 9, which depict a cylinder attaching member 60 for end 25 of plate 12. The cylinder attaching member for end 28 is identical to member 60. Member 60 is coextensive in length with the width of plate 12. Member 60 has a curved portion 61 adapted to ride in a slot 62 formed between saddle 10a and cylinder 10c. As a result, member 60 is circumferentially movable relative to cylinder 10. A movable laterally extending projection 63 on member 60 points away from plate 12. Projection 63 has a tapered nose-shaped surface that mates with the hook formed on end 25, e.g., projection 63 tapers at an angle of 30°. Compression springs 64, which are retained at one end by bores 65 in the end of saddle 10a, extend between saddle 10a and member 60 at evenly spaced intervals to urge member 60 circumferentially away from saddle 10a. Fins 70 on portion 61 ride in slots 71 cut in saddle 10a, which serve to limit the travel of member 60 away from the end of saddle 10a. When the hook at end 25 engages projection 63, projection 63 is spring-loaded by springs 64 so as to tension plate 12 on cylinder 10. In a typical example, springs 64 exert approximately 50 p.s.i. of tension on plate 12, which is sufficient to hold plate 12 on cylinder 10 in full conformity with its entire surface. In contrast, 200 to 700 p.s.i. of tension must be applied to a flexible printing plate that is flat in its unstressed condition. Recesses 66 are formed at intervals along projection 63 to receive the gussets at end 25.

The apparatus for molding plate 12 is disclosed in schematic form in FIGS. 10 through 14. A curved plate forming cavity 110 is formed between an outer mold half 111 and a mating inner mold half 112, which comprises a center section 113 and end sections 114 and 115. A matrix 141 (FIG. 15) is secured to outer mold half 111 to form the concave side of cavity 110. Center section 113 has sloping side surfaces that converge toward outer mold half 111, and end sections 114 and 115 each have a side surface contiguous to one of the sloping side surfaces of center section 113. Attaching bars 116 and 117, respectively, and end sections 114 and 115, respectively, have hook forming cavities 110a and 110b, which interconnect with cavity 110. The inside surface of each of cavities 110a and 110b is formed by the corresponding end section, and the outside surface of each of cavities 110a and 110b is formed by the corresponding attaching bar. An X-axis and a Y-axis lie in a horizontal plane and the axis of curvature of cavity 110, represented by a point 118, is vertical. Cavity 110 preferably has a right cylindrical curvature and is slightly smaller than one-half of a right cylinder so that two of the printing plates produced thereby can be mounted end-to-end on the printing cylinder of a conventional rotary letter press.

FIG. 10 shows inner mold half 112 mated with outer mold half 111 immediately after the formation of cavity 110. Attaching bars 116 and 117 are contiguous to end sections 114 and 115, respectively, of inner mold half 112. Thus, the ends of plate 12 are clamped against end sections 114 and 115 by bars 116 and 117, respectively.

Figure 11:
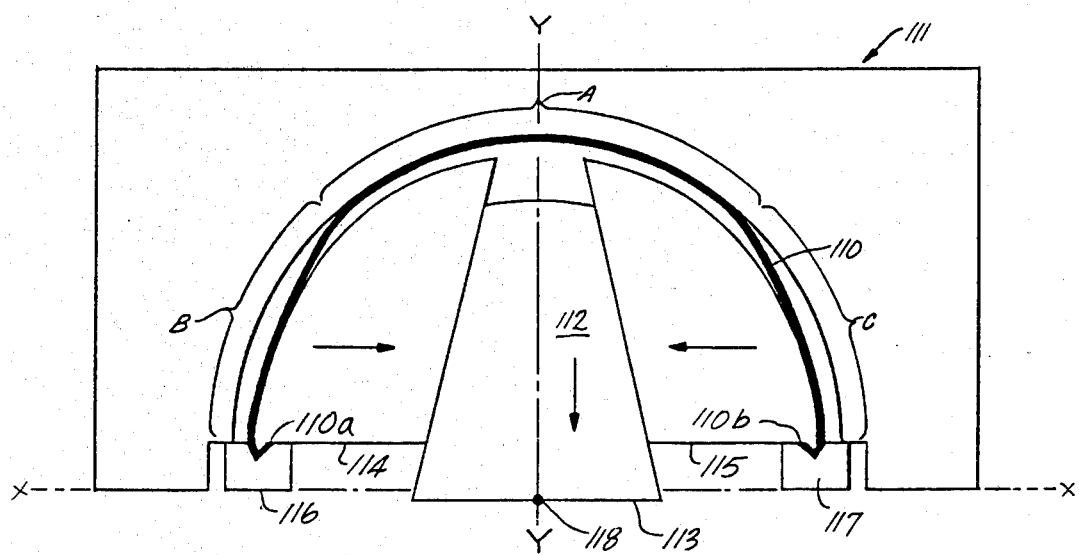

During an initial phase of the separation of inner mold half 112 from outer mold half 11 shown in FIG. 11, center section 113 moves a first incremental distance along the Y-axis. Movement of end sections 114 and 115 along the Y-axis is prevented, while maintaining contiguity with center section 113. Consequently, end sections 114 and 115 move together along the X-axis as center section 113 moves along the Y-axis. During this movement of end sections 114 and 115 together along the X-axis, the ends of cavity 110 are drawn away from outer mold half 111 by attaching bars 116 and 117, which move as a unit with end sections 114 and 115, respectively. The center of plate 12 bows outwardly by virtue of its flexibility and the reduction in the perimeter of inner mold half 112 caused by the movement of end sections 114 and 115 together. The outward bowing of plate 12 pushes approximately the entire center half of plate 12 into contact with outer mold half 111, pulls approximately the end quarters of plate 12, away from outer mold half 111, and creates a sharp point of departure of plate 12 away from outer mold half 111 at the intersections thereof.

Figure 12:
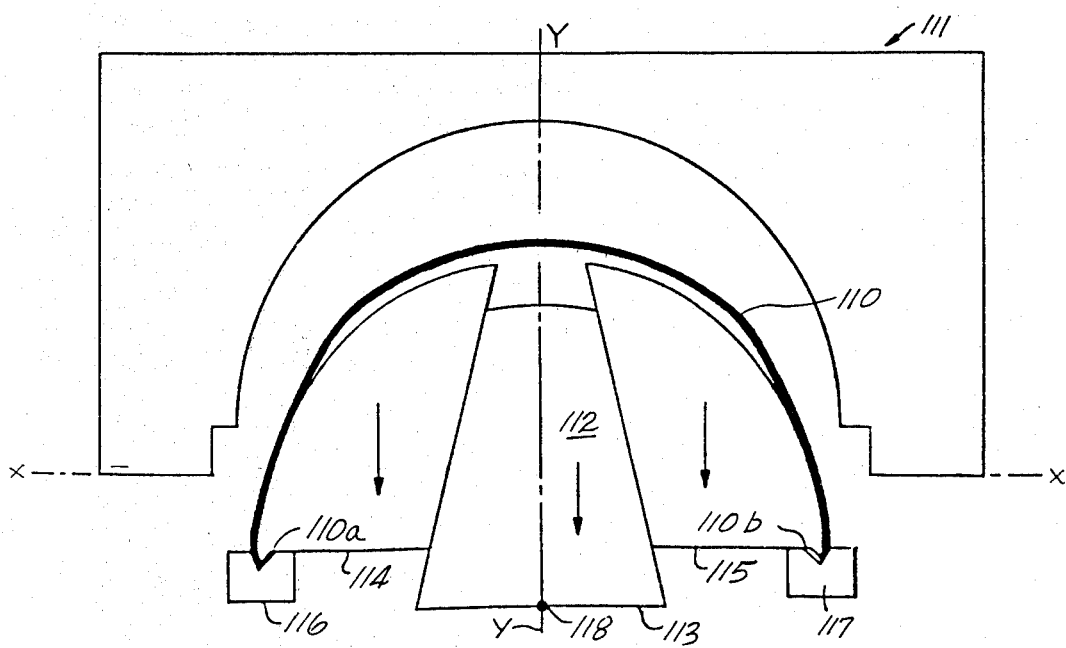

In the final phase of the separation of inner mold half 112 from outer mold half 111 shown in FIG. 12, center section 113 moves a second incremental distance along the Y-axis. As center section 113 moves through the second incremental distance, end sections 114 and 115 and attaching bars 116 and 117 all move with it as a unit along the Y-axis. Consequently, the center half of plate 12 separates from the surface of outer mold half 111.

To summarize the two phase separation of inner mold half 112 from outer mold half 111, the ends of plate 12 are first moved radially inward away from outer mold half 111, while maintaining the center of plate 12 in stationary contact with outer mold half 111, and then the center of plate 12 is moved radially inward away from outer mold half 111, while maintaining the ends of plate 12 away from outer mold half 111. This technique preserves the quality of the impressions transferred to plate 12 by a matrix mounted on outer mold half 111, because over its entire surface area plate 12 separates from the matrix while moving in a direction approximately perpendicular to the surface of the matrix, i.e., approximately in a radially inward direction.

Figure 13:
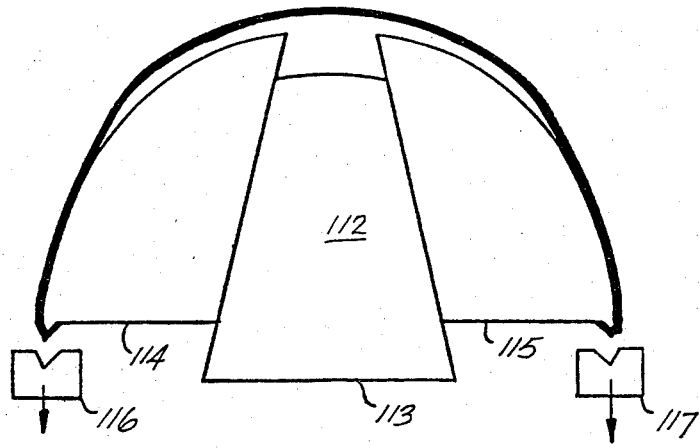

To release the ends of plate 12, as shown in FIG. 13, center section 113 moves as a unit with end sections 114 and 115 a third incremental distance along the Y-axis, and attaching bars 116 and 117 move along the Y-axis away from end sections 114 and 115 so as to separate from the outer surfaces of the lockup hooks.

Figure 14:
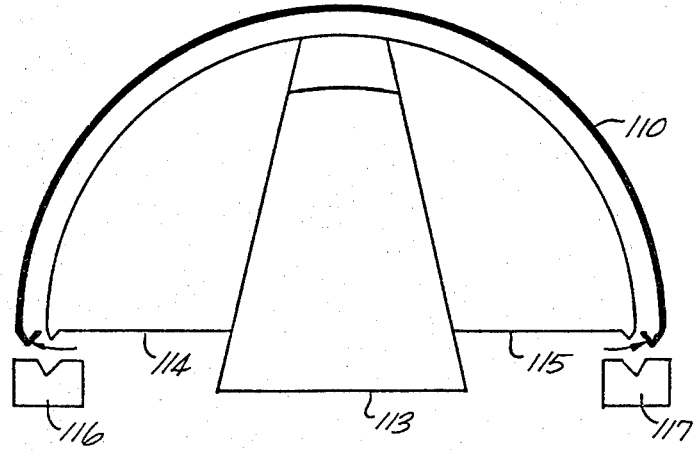

As center section 113 moves as a unit with end sections 114 and 115 a fourth incremental distance, as shown in FIG. 14, the lockup hooks of plate 12 are flipped by pins outwardly away from end sections 114 and 115 in opposite directions of rotation, as indicated by the arrows. As a result, plate 12 peels off the surface of inner mold half 112 from its ends toward its center, and drops downwardly out of the region between outer mold half 111 and inner mold half 112. A conveyor belt or other mode of transportation for plate 12 could be located directly underneath the molding apparatus to intercept plate 12 as it falls in press ready condition.

The molding apparatus, which is described in more detail in my referenced U.S. Pat. No. 3,986,698, is capable of automatically producing multiple printing plates. An electronic or hydraulic controller first operates an actuator to mate inner mold half 112 with outer mold half 111, i.e., to close cavity 110, injects molten plastic into cavity 110 and cavities 110a and 110b to form a molded plate in a one piece construction, and finally operates the actuator to separate inner mold half 112 from outer mold half 111, i.e., to open cavity 110, and to release the molded plate as a press ready plastic printing plate. This cycle is then repeated until the required number of plates are produced. The molding apparatus would be provided with conventional water cooling ducts, which are not shown.

In FIG. 15 is shown a conduit 155 for injecting a molten plastic material from which the printing plates are made into cavity 110 via a network 156 passing over a clamp 146 which holds matrix 141.

The described apparatus is capable of automatically producing multiple printing plates. An electronic or hydraulic controller first operates an actuator to mate inner mold half 112 with outer mold half 111 in the described manner, then ejects molten plastic into cavity 110 to form a molded plate, and finally operates the actuator to separate inner mold half 112 from outer mold half 111 to release the molded plate. This cycle is then repeated until the required number of plates are produced.

The procedure for installing the molded plates is as follows: First, the hook at end 24 is placed over projection 49. Barb 52 forces arms 40 and 41 further apart as projection 49 begins to engage the hook at end 24. When projection 49 has penetrated completely into the hook at end 24, barb 52 engages slot 44, and arms 40 and 41 return to their normal position, which retains barb 52 in slot 44. Slot 44 is wider than barb 52 to permit lateral movement of end 24 on member 47, while barb 52 temporarily retains end 24 on cylinder 10 until installation is completed. Thus, the operator does not have to hold plate 12 continuously prior to the application of tension of plate 12 by projection 63. Second, a shaft 72 of a cam wrench 73 is placed in a radial bore 74 in cylinder 10c and is turned by an operator, as represented by an arrow 75, to drive a cam 76 against member 60. Member 60 travels toward the end of cylinder 10a, as represented by an arrow 77, until the hook at end 25 engages projection 63 (FIGS. 8 and 9). Third, shaft 72 is turned back to its original position shown in FIG. 8, thereby spring-loading projection 63 to tension plate 12, and cam wrench 73 is removed. The second and third steps can be repeated at several bores 74 located along the surface of cylinder 10c until projection 63 engages the hook on end 25 along its entire width. This completes the installation procedure.

Gussets 42 strengthen the connection between arms 40 and 41, and hold the laterally extending hooks at ends 24 and 25 of plate 12 in close conformance with projections 49 and 63, respectfully, as the plate is tensioned, thereby preventing edge smudging during printing due to wrinkling around the edges of the printing region of the plate. Without gussets 42, or with too few gussets 42, the acute angle formed between arms 40 and 41 of each hook would tend to open due to the tension under which plate 12 is placed. Wrinkling and/or non-conformance of the ends of plate 12 to cylinder 10 giving rise to edge smudging during printing would be the result. Thus, the combination of a printing plate with a curvature that matches the curvature of the cylinder in its stressed condition and gusseted end hooks in a one-piece construction together maintain close conformance of the entire plate to the cylinder, which results in clear, smudge-free printing.

At each end of plate 12, plate 12 is indexed laterally on cylinder 10 by a close fit between two of the gussets of the hook and the recesses in the projections that receive them. As shown in FIG. 6 for end 24 a surface 80 of the nearest recess 50 on each side of center line 51, is precisely spaced from center line 51. When the hook on end 24 engages projection 49, the gussets 42 received by the two nearest recesses 50 fit snugly against surfaces 80 to precisely fix the lateral position of plate 12 on cylinder 10. The remaining recesses 50 are positioned and dimensioned to receive the respective gussets 42 with a very loose fit so as not to interfere with the described lateral indexing of plate 12.

It is only necessary that opposite sides of two of the recesses of each projection form a close fit with their receiving gussets. Thus, instead of surfaces 80 of the nearest recesses 50 being located for a snug fit with the gussets 42 received thereby, surfaces 81 could be located for a snug fit with such gussets, while surfaces 80 are spaced from the gussets as shown in FIG. 6 for surfaces 81. In other words, the relative positions between surfaces 80 and 81 and the gussets received by their recesses could be reversed. Alternatively, surfaces 80 and 81 could both be located for a snug fit with the gussets 42 received by the nearest recesses on each side of center line 51.

It should be noted that the movable cylinder attaching members are located at the trailing end of each printing plate so any slack in the plates caused by the pressure of the blanket cylinder can be taken up by the springs, thereby continuously maintaining the plates in tension, but no more tension than is needed at the particular moment. In some press operations, the directions of rotation of cylinders 10 and 11 are reversed. In such case, the installation of saddles 10a and 10b would also be reversed, so the movable cylinder attaching members remain at the trailing end of each printing plate.

The described embodiment of the invention is only considered to be preferred and illustrative of the inventive concept; the scope of the invention is not to be restricted to such embodiment. Various and numerous other arrangements may be densed by one skilled in the art without departing from the spirit and scope of this invention. For example, other types of cylinder attaching arrangements could be employed with the flexible printing plate constructed according to the invention. Further, the described cylinder attaching arrangement could still be used to advantage with flexible printing plates that are flat in their unstressed condition. If the plate cylinder is specifically designed for the thickness of a plastic printing plate, i.e., if no saddles are required, the disclosed cylinder attaching members could be directly mounted on the plate cylinder proper. Although it is preferable to employ the surfaces of the two gusset receiving recesses nearest to the center line of the cylinder to index the printing plate laterally on the cylinder, as described, the surfaces of any pair of recesses could be employed to perform this function. The use of barb 52 and slot 44 is optional.

What is claimed:

1. A method for producing plastic printing plates comprising, in the order recited, the steps of:

forming a mold cavity having a material injection inlet, a first portion that defines a printing plate, and second and third portions that define laterally extending cylinder lockup means at its ends, the second and third portions interconnecting with the first portion, one side of the cavity being formed by a matrix with printing depressions;

injecting a molten plastic material into the inlet of the formed mold cavity to form a molded plastic piece comprising a printing plate with cylinder lockup means in a one piece plastic construction;

opening the first portion of the mold cavity and releasing the printing plate; and thereafter opening the second and third portions of the mold cavity and releasing the lockup means to release the molded plastic piece from the mold cavity as a press ready printing plate.

2. A method for producing plastic printing plates comprising, in the order recited, the steps of:

forming a mold cavity having a material injection inlet, a first portion that defines a printing plate, and second and third portions that define laterally extending cylinder lockup means at its ends, the second and third portions interconnecting with the first portion, one side of the cavity being formed by a matrix with printing depressions;

injecting a molten plastic material into the inlet of the formed mold cavity to form a molded plastic piece comprising a printing plate with cylinder lockup means in a one piece plastic construction;

opening the first portion of the mold cavity and releasing the printing plate; and thereafter opening the second and third portions of the mold cavity and releasing the lockup means to release the molded plastic piece from the mold cavity as a press ready printing plate by moving the ends of the plate inwardly away from the matrix while maintaining the center of the plate in stationary contact with the matrix and moving the center of the plate inwardly away from the matrix while maintaining the ends of the plate away from the matrix.

3. The method of claim 1, in which the matrix is a portion of a cylinder, the ends of the plate in the mold lie on a first axis and the center of the plate in the mold lies on a second axis perpendicular to the first axis, the ends of the plate move inwardly away from the matrix along the first axis while the center of the printing plate is maintained in stationary contact with the matrix, and the center of the plate moves inwardly away from the matrix along the second axis while the ends of the plate are maintained away from the matrix.

4. The method of claim 1, in which the matrix is one-half of a right cylinder, the ends of the plate in the mold lie along a first axis, the center of the plate in the mold lies along a second axis perpendicular to the first axis, and the step of moving the ends of the plate inwardly away from the matrix while maintaining the center of the plate in stationary contact with the matrix comprises moving the ends of the plate inwardly along the first axis to flex the center of the plate into stationary contact with the matrix as the ends of the plate move inwardly in order to create a sharp separation of each end of the plate from the matrix.

* * * * *